United States Patent
Sundaresan et al.

(10) Patent No.: US 9,654,174 B2
(45) Date of Patent: May 16, 2017

(54) METHOD AND APPARATUS FOR MANAGING A POWER LINE COMMUNICATION NETWORK IN MULTI-FLOW ENVIRONMENTS

(71) Applicant: NEC Laboratories America, Inc., Princeton, NJ (US)

(72) Inventors: Karthikeyan Sundaresan, Howell, NJ (US); Mohammad Khojastepour, Lawrenceville, NJ (US); Sampath Rangarajan, Bridgewater, NJ (US); Ahmed O. F. Atya, Riverside, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/845,656

(22) Filed: Sep. 4, 2015

(65) Prior Publication Data
US 2016/0094274 A1  Mar. 31, 2016

Related U.S. Application Data

(60) Provisional application No. 62/055,241, filed on Sep. 25, 2014.

(51) Int. Cl.
*H04B 3/54* (2006.01)
*H04L 12/26* (2006.01)
*H04L 12/24* (2006.01)

(52) U.S. Cl.
CPC ......... *H04B 3/542* (2013.01); *H04L 41/0893* (2013.01); *H04L 43/0888* (2013.01)

(58) Field of Classification Search
CPC .................................................. H04B 3/542
See application file for complete search history.

(56) References Cited

U.S. PATENT DOCUMENTS

2010/0278223 A1* 11/2010 Riveiro .................. H04B 3/542
 375/222
2014/0105313 A1* 4/2014 Kim ...................... H04B 3/542
 375/257

OTHER PUBLICATIONS

Vlachou, C. et al., "Performance Analysis of MAC for Power-Line Communications," The 2014 ACM international conference on Measurement and modeling of computer systems, Jun. 2014. (pp. 585-586).

(Continued)

*Primary Examiner* — Jaison Joseph
(74) *Attorney, Agent, or Firm* — Joseph Kolodka

(57) ABSTRACT

A method for managing a power line communication network in a multi-flow environment. The method includes determining an average throughput between each pair of nodes acting in isolation within the power line communication network, defining logical zones by grouping each pair of nodes if the average throughput between the pair of nodes exceeds a first threshold, wherein the logical zones include a plurality of strongly coupled zones. The method further includes determining an aggregate throughput for a pair of flows between randomly selected pairs of nodes acting concurrently between the plurality of strongly coupled zones, determining a plurality of pair of flows that can be concurrently operated when the aggregate throughput exceeds the average throughput, estimating a resulting throughput of the plurality of pair of flows that can be concurrently operated, and optimizing a schedule for the plurality of pair of flows based on the resulting throughput.

14 Claims, 6 Drawing Sheets

(56) References Cited

OTHER PUBLICATIONS

Yenamandra, V. et al., "Vidyut: Exploiting Power Line Infrastructure for Enterprise Wireless Networks," Proceedings of the 2014 ACM conference on SIGCOMM, Aug. 2014. (pp. 595-606).

* cited by examiner

METHOD AND APPARATUS FOR MANAGING A POWER LINE COMMUNICATION NETWORK IN MULTI-FLOW ENVIRONMENTS

RELATED APPLICATION INFORMATION

This application claims priority to provisional application Ser. No. 62/055,241 filed on Sep. 25, 2014, incorporated herein by reference.

BACKGROUND

Technical Field

The present invention generally relates to methods for managing a power line communication network in multi-flow environments. More particularly, the present disclosure is related to using spatial reuse capability for managing a power line communication network in multi-flow environments.

Description of the Related Art

Internet connectivity is becoming a vital requirement in several business segments and conventional enterprises, such as retail, healthcare, industrial automation and warehousing. Deploying an Ethernet backhaul in many of these new environments may not be a cost-effective option. Availability of power line networks can be leveraged to serve as a cost-effective backhaul in such cases. Specifically, in several of these applications, the data access patterns are not just with respect to the internet through a gateway node, but involve a large amount of local, peer-to-peer traffic. Examples include transferring health records between medical devices and IT servers in hospitals, video surveillance data between cameras and storage servers in retail/warehouses, etc.

Generally, Power Line Communication (PLC) is a communication technology that enables sending data over existing power cables. PLCs provide high bandwidth connectivity, typically up to 1.5 gigabits per second (Gbps), in settings where there is no built-in network infrastructure. While power line networks may be used for broadband communication, current PLC networks are not capable of supporting a multitude of data flow operations delivering high throughput.

Although the performance of PLC is stable, such that throughput quality does not fluctuate and can deliver high rates (e.g., 100's of Mbps) on individual links operating in isolation, the performance of PLC degrades significantly in multi-flow environments (e.g., providing only tens of Mbps or lower) with increasing number of flows operating at the application layer. Hidden terminals in the PLC may be responsible for this degradation, even in the presence of a medium access (MAC) layer. Hidden terminals arise when two transmitters, that cannot hear each other, transmit simultaneously and cause collisions at a receiver. Design of new mechanisms, such as Request to Send (RTS) and Cleared to Send (CTS) mechanisms, to make a medium access (MAC) layer robust to the PLC channel would not only incur overhead, but would also necessitate modifications to the PLC specifications and adapters and hence may be incompatible with current PLC products.

SUMMARY

In one embodiment of the present principles, a method for optimizing a power line communication network in a multi-flow environment is provided. In an embodiment, the method may include determining an average throughput between each pair of nodes acting in isolation within the power line communication network, defining logical zones by grouping each pair of nodes if the average throughput between the pair of nodes exceeds a first threshold, wherein the logical zones include a plurality of strongly coupled zones, determining an aggregate throughput for a pair of flows between randomly selected pairs of nodes acting concurrently between the plurality of strongly coupled zones, determining a plurality of pair of flows that can be concurrently operated when the aggregate throughput exceeds the average throughput, estimating a resulting throughput of the plurality of pair of flows that can be concurrently operated, and optimizing a schedule for the plurality of pair of flows in the power line communication network based on the resulting throughput.

In another embodiment, a system for managing a power line communication network in a multi-flow environment is provided. In an embodiment, the system may include a measurement device to determine an average throughput between each pair of nodes acting in isolation within the power line communication network, a zone constructor to define logical zones by grouping each pair of nodes if the average throughput between the pairs of nodes exceeds a first threshold, wherein the logical zones include a plurality of strongly coupled zones, a pair selector, coupled to a bus, to determine an aggregate throughput for a pair of flows between randomly selected pairs of nodes acting concurrently between the plurality of strongly coupled zones, a classifier to determine a plurality of pairs of flows that can be concurrently operated when the aggregate throughput exceeds the average throughput, a throughput predictor to estimate a resulting throughput of the plurality of pair of flows than can be concurrently operated, and a scheduler, coupled to the bus, to optimize a schedule for the plurality of pair of flows in the power line communication network based on the resulting throughput.

In yet another aspect of the present disclosure, a computer program product is provided that includes a computer readable storage medium having computer readable program code embodied therein for performing a method for managing a power line communication network in a multi-flow environment. In an embodiment, the method may include determining an average throughput between each pair of nodes acting in isolation within the power line communication network, defining logical zones by grouping each pair of nodes if the average throughput between the pair of nodes exceeds a first threshold, wherein the logical zones include a plurality of strongly coupled zones, determining an aggregate throughput for a pair of flows between randomly selected pairs of nodes acting concurrently between the plurality of strongly coupled zones, determining a plurality of pair of flows that can be concurrently operated when the aggregate throughput exceeds the average throughput, estimating a resulting throughput of the plurality of pair of flows that can be concurrently operated, and optimizing a schedule for the plurality of pair of flows in the power line communication network based on the resulting throughput.

These and other features and advantages will become apparent from the following detailed description of illustrative embodiments thereof, which is to be read in connection with the accompanying drawings.

BRIEF DESCRIPTION OF DRAWINGS

The present principles will provide details in the following description of preferred embodiments with reference to the following figures wherein.

DETAILED DESCRIPTION OF PREFERRED EMBODIMENTS

The present principles are directed to a method and apparatus for managing a power line communication network in a multi-flow environment. One of the main challenges in power line communication systems is providing high throughputs capable of supporting multi-flow operations. In one aspect, the methods, systems and computer program products disclosed herein at least manage flows to improve system performance in a power line communication network. In addition, the instant methods and systems provide effective management of power line communication systems to provide reliable, high throughput network performance for multi-flow operations with low cost, less complexity and low overhead.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Figure 1:
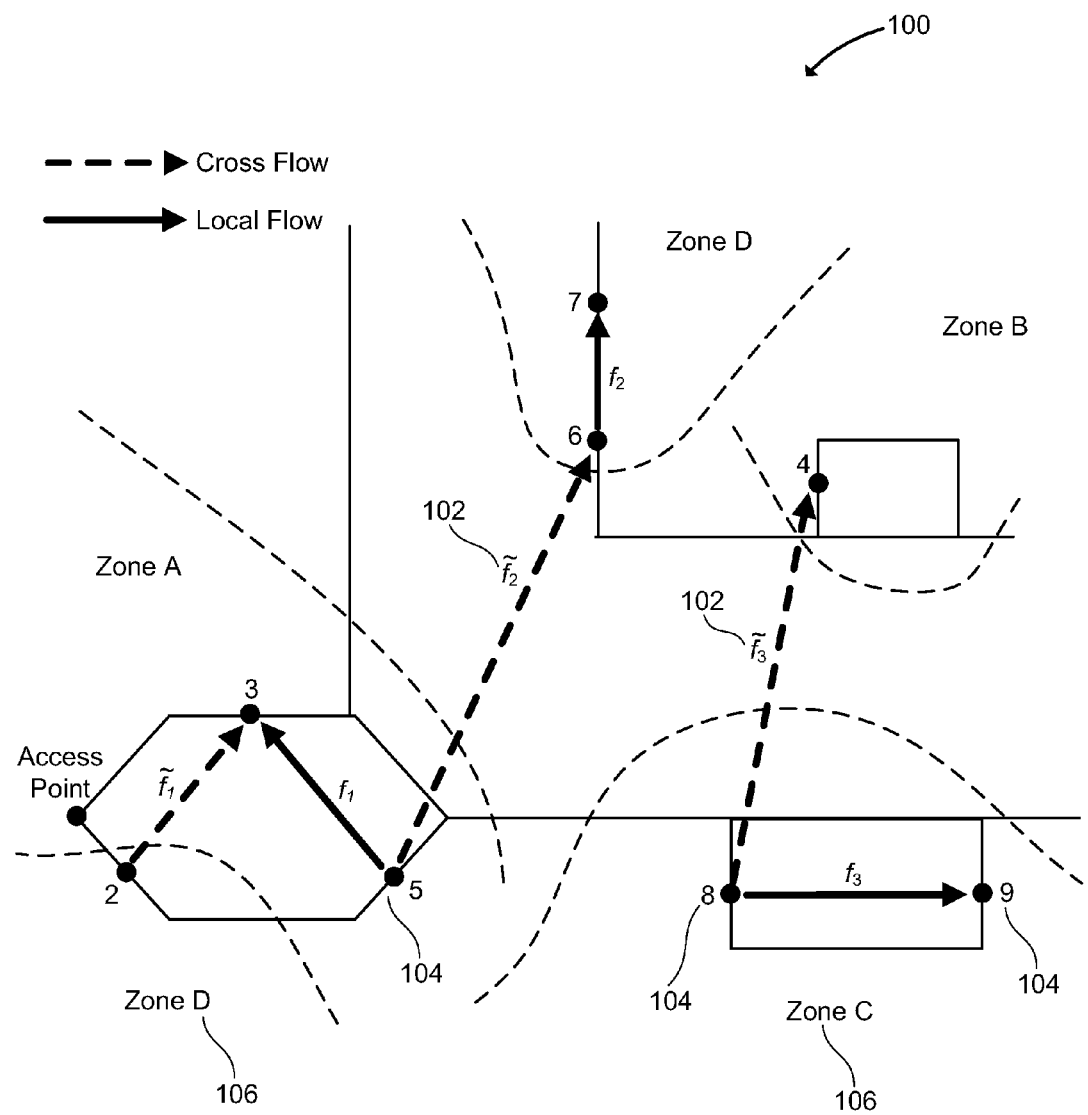
FIG. 1 is a schematic of an exemplary power line communication network, in accordance with an embodiment of the present principles.

Referring to the drawings in which like numerals represent the same or similar elements and initially to FIG. 1, an exemplary power line communication network 100 is illustratively depicted, in accordance with an embodiment of the present principles. In FIG. 1, a throughput flow 102 may occur between nodes 104. A flow 102, $f_{ij}$, is a stream of application packets that originates from a sender node 104, i, towards a neighboring and/or designated destination node 104, j. When a flow 102 occurs between two nodes 102 in the power line communication network 100, the nodes 102 may be referred to as a pair of nodes.

In an exemplary embodiment, a node may be one or more of a physical computing device, virtual machine, data communication equipment (DCE), data terminal equipment (DTE), etc. In communication networks, a physical node may be an electronic device attached to a network and capable of receiving/transmitting information over the network. A node may be a connection point, a redistribution point, or a communication endpoint. With reference to FIG. 1, it should be understood that nodes 104 are given numbers (e.g., 2-9) for exemplary purposes, and such numbers are used in conjunction with and correspond to nodes in FIG. 5, which will be described below in further detail.

In accordance with the present principles, the nodes 104 may be grouped into zones 106 depending on multi-path effects. In an embodiment, the zones 106 are zone locations in the communication network 100 and may also be referred to herein as logical zones, geographical zones, and/or virtual zones, etc. While flows 102 within a zone 106 can sustain relatively high throughputs when activated at each node 104 in isolation, the zones 106, and corresponding nodes 104 within the zones 106, may contend amongst each other. For example, flows 102 that belong to different zones 106 may or may not contend with each other, similar to adjacent cells in a Wireless LAN. The zones 106 are not simply determined by the physical locations of the nodes 104. Rather, the zones 106 depend on the PLC topology and the devices (e.g., ovens, laptops, etc.) that may be connected to the network 100, since the impedance projected by such devices influence signal interactions.

In one embodiment, a PLC network topology may be virtually divided into zones 106 based on the electrical connectivity between nodes 104. A zone 106, $\mathscr{Z}$, is defined as a subset of nodes 104, $n \subset N$, in which the average throughput, $\tau$, of the flow 102 between its respective nodes 104 is greater than or equal to a first throughput threshold, $\geq \alpha$, herein after referred to as a first threshold. For example, the first throughput threshold $\alpha$ may have a maximum link throughput of 100 megabits per second (Mbps). In one embodiment, a node 104 is included in a zone 106 (e.g., $i \in \mathscr{Z}$) if and only if the average throughput of the flow 102 is greater than or equal to a first threshold (e.g., $\tau_{ij} \geq \alpha$, $\forall j \in \mathscr{Z} (j \neq i)$).

In a further embodiment, pairs of zones 106 may be classified as either loosely coupled zones or strongly coupled zones. In one embodiment, two zones 106 ($\mathscr{Z}_1, \mathscr{Z}_2$) may be loosely coupled (LC) zones if there are no common nodes 104 between them and the average throughput of the flow 102 between any node 104 in a first zone 106 and any node 104 in a second zone 106 is less than a zone threshold, $\eta$, e.g., $\tau_{ij} \leq \eta$, $\forall i \in \mathscr{Z}_1, j \in \mathscr{Z}_2$. The zone threshold may be referred to herein as a second threshold. In an embodiment, loosely coupled zones are defined as flows 102 that are fully contained within two LC zones 106, wherein the zones 106 do not strongly influence each other, and may be activated simultaneously and/or concurrently to provide spatial reuse capability. Spatial reuse capability is an efficiency mechanism that allows multiple nodes 104 to utilize the entirety of its bandwidth/throughput. In contrast, a pair of zones 106, such as, for example, including a transmitter i and a receiver j, are strongly coupled (SC) zones if the average throughput of a flow 102 is greater than the zone threshold (e.g., $\tau_{ij} > \eta$), according to the present principles.

Defining and/or constructing zones 106 are useful in capturing the throughput influence flows 102 have on each other, based on their mutual contention/interaction on the physical layer/medium. A simple clustering of nodes 104 based on geo-location to form zones 106 is insufficient. This is because, unlike in a wireless network, many factors relating to the electrical network topology (e.g., circuit breakers, line phases, load, etc.) influence the throughput of a PLC flow that is difficult to capture accurately through channel models alone.

According to the present principles, after the throughput in the flow 102 occurring between a pair of nodes 104 is determined, the zones 106 may be defined and/or constructed and the PLC flows 102 may be classified into two categories, namely, local zone flows (LZF) and cross zone flows (CZF). In one embodiment, a flow 102 is a local zone flow if both the source (e.g., transmitter) and sink (e.g., receiver) nodes belong to the same zone 106, while a flow 102 is considered a cross zone flow if the source and sink nodes belong to different zones 106. An example of throughputs measured in megabits per second (Mbps) obtained by individual flows 102, local zone pair of flows (LZF), and cross zone pair of flows (CZF), is presented in Table 1, in accordance with the present principles.

TABLE 1

| Individual Throughput of Flows | | | | | |
|---|---|---|---|---|---|
| $f_1$ | $\tilde{f}_1$ | $f_2$ | $\tilde{f}_2$ | $f_3$ | $\tilde{f}_3$ |
| 291 | 42.9 | 95.6 | 11.8 | 236 | 11.3 |
| Throughput of Local Zone Flow (LZF) | | | | | |
| | $f_1$ | | $f_2$ | | $f_3$ |
| $f_1$ | N/A | | 379 | | 331 |
| $f_2$ | 379 | | N/A | | 221 |
| $f_3$ | 331 | | 221 | | N/A |
| Throughput of Cross Zone Flow (CZF) | | | | | |
| | $\tilde{f}_1$ | | $\tilde{f}_2$ | | $\tilde{f}_3$ |
| $\tilde{f}_1$ | N/A | | 30.9 | | 18.39 |
| $\tilde{f}_2$ | 30.9 | | N/A | | 11.6 |
| $\tilde{f}_3$ | 18.39 | | 11.6 | | N/A |

Based on the definition of zones 106, flows 102 between nodes 104 belonging to the same zone 106, namely LZFs, exhibit higher throughputs than flows 102 between nodes 104 belonging to different zones 106, namely CZFs. Similarly, if two LZFs belong to two loosely coupled (LC) zones 106, the two LZF flows 102 have little impact on each other and are called disjoint flows. Disjoint flows can be operated/activated concurrently (e.g., spatial reuse capability) to yield higher aggregate throughput (e.g., throughput between a pair of flows) than the average of the individual flows 102, as shown in Table 1. For example, if flows $f_1$ and $f_3$ are concurrently active, the flows 102 yield an aggregate throughput of 331 Mbps, as opposed to an average throughput of 263.5 Mbps if the flows $f_1$ and $f_3$ were sequentially invoked in isolation.

However, this is not always the case for non-disjoint flows, as seen in Table 1. While flows 102 in LC zones 106 may be activated concurrently to provide spatial reuse capability in a straight-forward manner, it is not clear if flows 102 in strongly coupled (SC) zones 106 can also contribute to spatial reuse. For example, concurrent invocation of flows $\tilde{f}_1$ and $\tilde{f}_3$ yields an aggregate throughput of 18.39 Mbps which is lower than the 27.1 Mbps which is achieved if the flows are activated one after the other in isolation. The higher aggregate throughput from operating pairs of flows concurrently indicates that even if flows 102 are non-disjoint (e.g., flows belonging to SC zones) and may influence each other, spatial reuse capability may be obtained in the PLC network 100. However, with an increased number of flows 102 (e.g., flows greater than or equal to 3), the opportunity for spatial reuse capability disappears and operating multiple flows 102 degrades performance of the PLC network 100.

Figure 2:
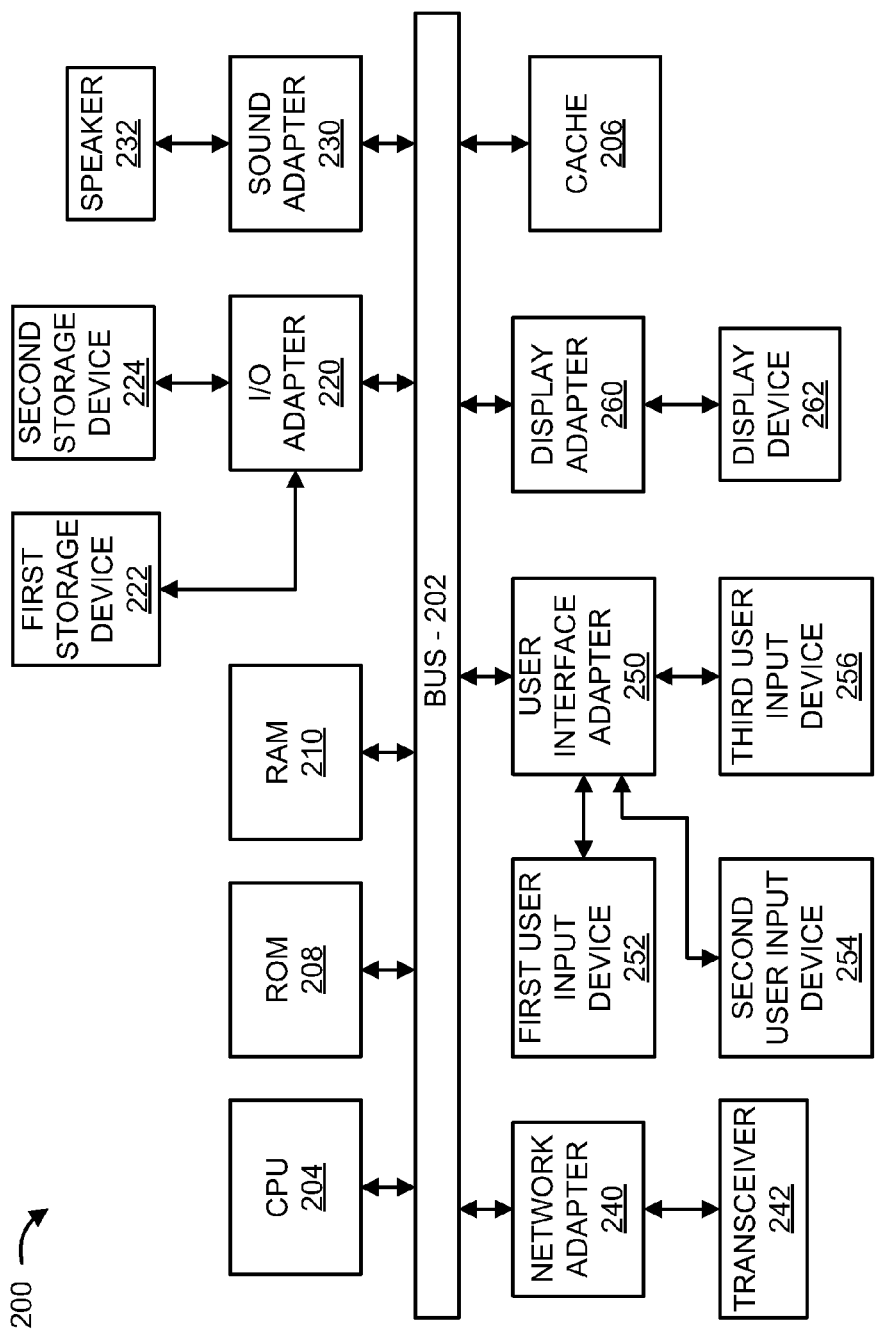
FIG. 2 shows an exemplary processing system to which the present principles may be applied, in accordance with an embodiment of the present principles.

Now referring to FIG. 2, an exemplary processing system 500 to which the present principles may be applied is illustratively depicted in accordance with one embodiment of the present principles. The processing system 200 includes at least one processor ("CPU") 204 operatively coupled to other components via a system bus 202. A cache 206, a Read Only Memory ("ROM") 208, a Random Access Memory ("RAM") 210, an input/output ("I/O") adapter 220, a sound adapter 230, a network adapter 240, a user interface adapter 250, and a display adapter 260, are operatively coupled to the system bus 202.

A storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices.

A speaker 232 is operatively coupled to system bus 202 by the sound adapter 230. A transceiver 242 is operatively coupled to system bus 202 by network adapter 240. A display device 262 is operatively coupled to system bus 202 by display adapter 260.

A first user input device 252, a second user input device 254, and a third user input device 256 are operatively coupled to system bus 202 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used. The user input devices 252, 254, and 256 can be the same type of user input device or different types of user input devices. The user input devices 252, 254, and 256 are used to input and output information to and from system 1200.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present principles provided herein.

Figure 3:
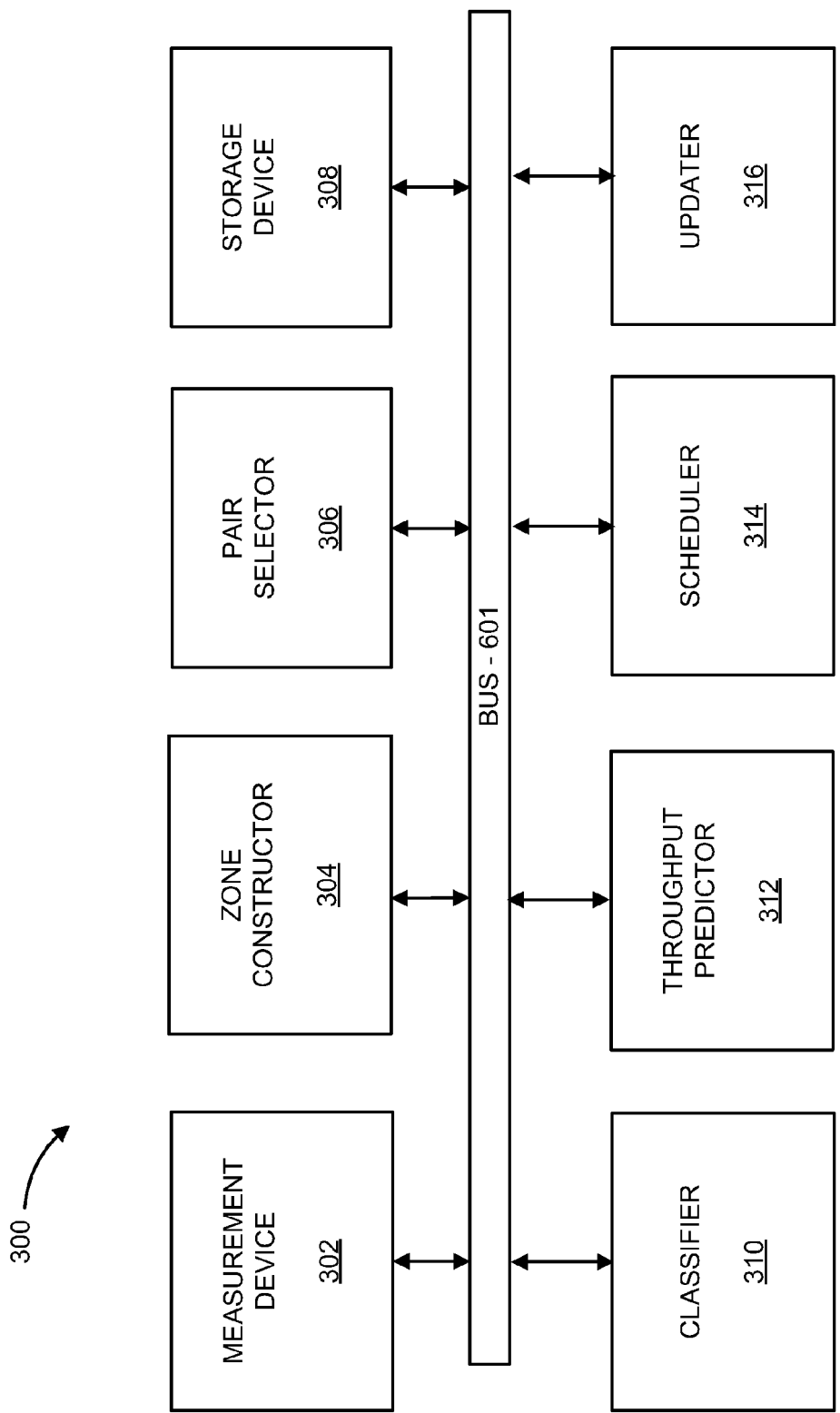
FIG. 3 shows an exemplary system for optimizing power line communication and networking in multi-flow environments, in accordance with an embodiment of the present principles.

Moreover, it is to be appreciated that system 300 described below, with respect to FIG. 3, is a system for implementing respective embodiments of the present principles. Part or all of processing system 200 may be implemented in one or more of the elements of system 300.

Figure 4:
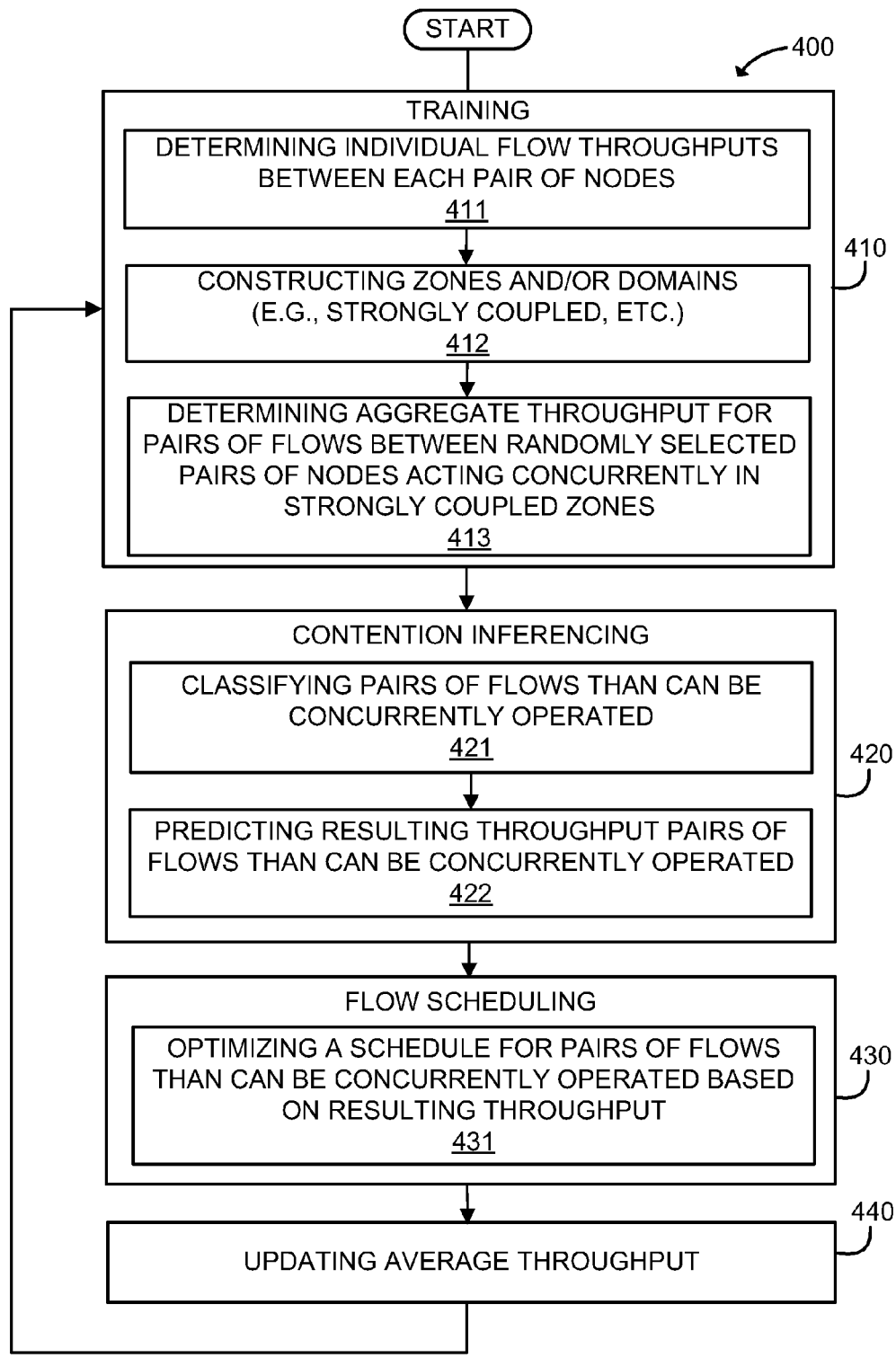
FIG. 4 is a block diagram illustratively depicting an exemplary method for optimizing power line communication and networking in multi-flow environments, in accordance with an embodiment of the present principles.

Further, it is to be appreciated that processing system 200 may perform at least part of the method described herein including, for example, at least part of method 400 of FIG. 4. Similarly, part or all of system 300 may be used to perform at least part of method 400 of FIG. 4.

FIG. 3 shows an exemplary system 300 for managing a power line communication network in a multi-flow environment, with continued reference to FIG. 1, in accordance with one embodiment of the present principles. While many aspects of system 300 are described in singular form for the sake of illustration and clarity, the same can be applied to multiple ones of the items mentioned with respect to the description of system 300. For example, while a measurement device 302 is described, more than one measurement device 302 may be used in accordance with the teachings of the present principles.

The system 300 may include a measurement device 302, a zone constructor 304, a pair selector 306, a storage device 308, a classifier 310, a throughput predictor 312, a scheduler 314 and an updater 316. In an embodiment, one or more functions provided by the one or more devices in system 300 may be provided by a single node or a plurality of nodes in the PLC network acting as, for example, a central controller (CC).

The measurement device 302 may determine, for example, an average flow throughput in a flow 102 between each pair of nodes 104 acting in isolation in the PLC network 100. The average flow throughputs of pairs of nodes acting in isolation may be employed to define and/or construct geographical zones 106 and/or domains in the PLC network according to various embodiments of the present principles. The measurement device 302 may perform all or some of the embodiments as described in block 411 of FIG. 4, which will be described in further detail below.

The zone constructor 304 may, upon receipt of the individual flow throughputs and/or average throughput, define and/or construct the logical zone locations and domains (e.g., zones 106). For example, in one embodiment, the zone constructor 304 may be configured to construct one or more of loosely coupled zones and/or strongly coupled zones. The zone constructor 604 may perform all or some of the embodiments as described in block 412 of FIG. 4, which will be described in further detail below.

The pair selector 306 may randomly select pairs of nodes acting concurrently between zones. For example, the pair selector 306 may randomly select a first pair of nodes in a first zone and a second pair of nodes in a second node. In a preferable embodiment, the randomly selected pairs of nodes include flows in different zones, namely in strongly coupled zones. In a further embodiment, the pair selector 606 may be configured to concurrently activate the randomly selected pairs of nodes and determine an aggregate throughput of the respective flows (e.g., a pair of flows) between the randomly selected pairs of nodes. In an embodiment, the output of the measurement device 302, the zone constructor 304, and/or the pair selector 306, may be stored in a storage device 308, and may be used as input for the classifier 310, the throughput predictor 312, and/or the scheduler 314, according to various embodiments. The pair selector 606 may perform all or some of the embodiments as described in block 413 of FIG. 4, which will be described in further detail below.

The classifier 310 may determine a plurality of pairs of flows that can be concurrently operated. In an embodiment, the classifier 310 may determine the plurality of pairs of flows that can be concurrently operated when the aggregate throughput exceeds the average throughput. For example, pairs of flows to be activated concurrently (e.g., concurrently activated pairs of flows) may have higher aggregate throughputs than the average throughputs between the nodes acting in isolation. In an embodiment, the classifier 310 may be configured to employ a combination of classification models to accurately classify flow pairs into those that yield a higher aggregate throughput during concurrent operation (e.g., flow pairs that are reuse-friendly) and those that do not. The classifier 310 may perform all or some of the embodiments as described in block 421 of FIG. 4, which will be described in further detail below.

The throughput predictor 312 may estimate a resulting throughput of all of the plurality of pairs of flows that can be concurrently operated/activated (e.g., pairs of flows that are reuse-friendly). For example, once the classifier has determined which pairs of flows may be concurrently operated, the throughput predictor 312 can estimate the resulting throughput if all of the plurality of pairs of flows that can be concurrently operated are activated. In an embodiment, the throughput predictor 312 may employ a prediction model to determine the gains possible in throughput if multiple flows are activated simultaneously across strongly coupled zones. For example, the prediction model may include a boosting tree (BT) as a regression approach for prediction. The throughput predictor 312 may perform all or some of the embodiments as described in block 422 of FIG. 4, which will be described in further detail below.

The scheduler 314 may be configured to optimize a schedule for the plurality of pairs of flows and/or individual flows. For example, the scheduler 314 may determine an optimal schedule of pairs of flows that may be concurrently operated, as well as individual flows that should be operated in isolation, based on the average throughput, aggregate throughput, and/or resulting throughput, as will be described in further detail with reference to FIG. 4. Accordingly, the scheduler 314 may determine a schedule for scheduling flows and/or pairs of flows for spatial reused capability. Advantageously, the present principles provide a function that achieves the maximum throughput while simultaneously providing proportional fairness between flows (across epochs) and prioritizing latency-sensitive flows, as needed, in multi-flow environments. The scheduler 314 may perform all or some of the embodiments as described in block 431 of FIG. 4, which will be described in further detail below.

The updater 316 may determine and/or update the average throughputs of the individual throughputs between each pair of nodes. Because the addition or removal of devices and/or nodes on the PLC network may impact the flow throughput, and thus the zone construction, the updater 316 may determine and/or update any changes to the PLC network. For example, the updater 316 may determine the throughput measurements from a new node to each neighboring node when a new node is connected to the PLC network. Advantageously, the updater 316 may update the average throughput in the event of any changes to the PLC network, such as node arrivals/departures, significant changes in flow throughput in prior epochs, etc. In an embodiment, the updater 316 may update the average throughputs by considering one node at a time. The updater 316 may perform all or some of the embodiments as described in block 440 of FIG. 4, which will be described in further detail below.

It should be noted that while the above configuration is illustratively depicted, it is contemplated that other sorts of configurations may also be employed according to the present principles. These and other variations between configurations are readily determined by one of ordinary skill in the art given the teachings of the present principles provided herein, while maintaining the present principles.

In some embodiments, the measurement device 302, zone constructor 304, pair selector 306, storage device 308, classifier 310, throughput predictor 312, scheduler 314 and/or updater 316 of system 300 may be a virtual appliance (e.g., computing device, node, server, etc.), and may be directly connected to a network or located remotely for controlling via any type of transmission medium (e.g., Internet, intranet, internet of things, etc.). In some embodiments, measurement device 302, zone constructor 304, pair selector 306, storage device 308, classifier 310, throughput predictor 312, scheduler 314 and/or updater 316 may be a hardware device, and may be attached to a network or built into a network according to the present principles.

In the embodiment shown in FIG. 3, the elements thereof are interconnected by a bus 301. However, in other embodiments, other types of connections can also be used. Moreover, in one embodiment, at least one of the elements of system 300 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 300 are readily determined by one of ordinary skill in the art, given the teachings of the present principles provided herein.

Now referring to FIG. 4, a computer implemented method 400 for managing a power line communication network in a multi-flow environment is illustratively depicted according to one embodiment of the present principles. Advantageously, the method 400 may accurately predict a resulting throughput due to interactions between all pairs of flows that may be concurrently operated in the PLC network based on a small set of measurements, and efficiently schedule flows at the application layer in real-time towards achieving high spatial reuse capability. The method 400 can be performed, for example, by any of system 200 of FIG. 2 and/or system 300 of FIG. 3.

In one embodiment, a plurality of parameters related to the PLC network may be measured, received and/or determined according to various embodiments, and may be employed as input for training the PLC network for the method 400, as shown in block 410. In an embodiment, block 410 may include one or more of blocks 411, 412, or 413 described in further detail below.

In one embodiment, an average throughput between each pair of nodes acting in isolation may be determined in block 411. The average throughput may include individual flow measurements between each pair of nodes such that the pair of nodes are acting in isolation in the PLC network. Referring again to FIG. 1, individual flow throughputs of flows 102 between each pair of nodes 104 includes the average throughput between, for example, node 2 and node 3 while no additional nodes are activated. Accordingly, the individual flow measurements between each pair of nodes are measured to determine an average throughput. In one embodiment, the average throughput measurements between each pair of nodes may be collected by a central controller (CC), the central controller being a single node in the PLC network. These measurements are important since, unlike in wireless settings, the topology of the PLC network is not well structured. The measurements, namely the average throughput, may be used to construct zones and/or domains efficiently in block 412.

In block 412, based on the determined average throughput, the nodes in the PLC network are grouped to define and/or construct zones, such as logical zones. In one embodiment, a plurality of zones may be defined/constructed by grouping each pair of nodes when the average throughput ($\tau$) exceeds a first threshold $\alpha$. In contrast, if the determined average throughput ($\tau$) between a pair of nodes does not exceed the first threshold $\alpha$, the pair of nodes are not grouped into a zone. In a further embodiment, the pair of nodes may be grouped into zones such that the zones include a plurality of strongly coupled zones in block 412.

Zones may be classified, for example, as loosely coupled zones and/or strongly coupled zones. For example, when the average throughput between pairs of nodes is less than or equal to a second threshold ($\eta$), the pair of nodes may be grouped into a loosely coupled zone. Conversely, when the average throughput between pairs of nodes is greater than the second threshold ($\eta$), the pair of nodes may be grouped into a strongly coupled zone. By definition, loosely coupled zones include flows that do not strongly influence each other and, therefore, may be activated simultaneously and/or concurrently without degrading the performance of the PLC network. Generally, flows within the same zone sustain higher throughputs in comparison to the throughput for connections that span over different zones which is lower. In an embodiment, pairs of zones may be classified as strongly coupled zones or loosely coupled zones depending on whether flows in their respective zones affect each other when operated concurrently in block 412.

Zones may include a group of nodes such that the average throughputs achieved between a pair of nodes within the group is higher than a first threshold. However, the definition of a zone does not impose any constraints on the size of the zone, since smaller zone sizes would result in more zones, and vice versa. While increasing the number of zones (with smaller sizes) can improve fidelity, it comes at the expense of obtaining more information with regards to inter-zone flow interactions, some of which are redundant. According to the present principles, fidelity may refer to the accuracy of predicting a flow throughput during concurrent interaction with other flows. Thus, one embodiment of the present principles aims to keep the zone size as large as possible, e.g., tries to minimize the number of zones (and hence inter-zone measurements) needed to cover the nodes in the PLC network, while capturing the flow interactions across zones.

In an embodiment, an optimal number of zones may be determined by exhaustively creating different combinations of nodes to form geographical zones, and picking the combination that includes the least number of zones. For example, determining the value of the first threshold $\alpha$ may determine a number of zones in one embodiment. In one embodiment, a larger value of the first threshold $\alpha$ may reduce the number of zones and hence decrease the training measurements needed. However, a larger value of the first threshold $\alpha$ may significantly affect the accuracy in terms of classifying good links (e.g., nodes across zones may sustain good throughputs). In one embodiment, the first threshold $\alpha$ may be, e.g., 75% of the maximum achieved flow throughputs to balance the tradeoff between accuracy and reducing training measurements. For example, if a link (e.g., flow between a pair of nodes) is able to achieve seventy-five percent (75%) of the maximum (isolated) link throughputs possible, the link may be classified as a good quality link. Thus, in one embodiment, a first threshold value α may have a value of, e.g., 80 Mbps for defining and/or constructing the zones. As a general note, the absolute maximum link throughputs achieved is, e.g., 100 Mbps.

In an embodiment, at least one time scale may be used to construct the zones in block 212, namely a short time scale. A short time scale constructs the minimum number of zones given a set of individual (average) flow measurements between each pairs of nodes. For example, a short time scale may construct all zones at every epoch $T_c$ (e.g., every time interval) based on individual flow measurements from a prior short time interval using the following Method:

---
Method 1: Zone Construction
---
Input: G = (V, N)
Output: 𝒵 set of zones;
Initialization: G' = Complement(G) ;
 𝒰 = V' uncolored vertices. 𝒞 = φ Colored Vertices ;
C = φ set of colors;
while 𝒰 ≠ φ do
  v = HighestValence( 𝒰 );
  Color(v);
  C ← UpdateColorSet(C,v) ;
  𝒰 ← 𝒰 − v;
  𝒞 ← 𝒞 ∪ v;
for ∀e ∈ C do
  𝒵$_c$ = φ;
  for ∀v ∈ 𝒞 c = Color(v) do
    𝒵$_c$ ← 𝒵$_c$ ∪ v ;
--- where G is a graph of all nodes forming a vertex set V, G' is the complement of graph G, φ is the null set, C is the set of colors, c is a color from the set C, and v is a vertex, 𝒰 is the set of uncolored vertices, and 𝒞 is the set of colored vertices. A running example employing Method 1 to the PLC network 100 of FIG. 1 will be described in further detail below with reference to FIG. 5. In an embodiment, the zones may include a plurality of strongly coupled zones in block 412. Accordingly, the process may continue to block 413.

In block 413, a set of real-time throughput measurements related to pairs of inter-domain flows may be measured, determined and/or received in the plurality of strongly coupled zones. For example, a first pair of nodes in a first strongly coupled zone and a second pair of nodes in a second strongly coupled zone may be randomly selected and activated concurrently, the first and second strongly coupled zones being different zones. In accordance with the present principles, an aggregate throughput for a pair of flows between randomly selected pairs of nodes acting concurrently may be measured and/or determined in block 413. The real-time aggregate throughput measurements may be used to determine which inter-domain flows may be activated concurrently, as will be described below. Accordingly, the present principles enable fewer sets of real-time measurements to determine interactions between pairs of flows, since real-time measurements are determined in only randomly selected pairs of nodes in the strongly coupled zones.

Ordinarily, if there are a total of N nodes, $$\binom{N}{4} \cdot 3 = O(N^4)$$

measurements are measured, where O is the order of notation, because four nodes are used to establish a pair of flows (e.g., 3 distinct flow pairs for every 4 nodes). However, such approach would incur significant overhead, as these measurements are performed every epoch $T_c$ and the number of nodes N can be large. Accordingly, in one embodiment, the set of real-time throughput measurements includes the interactions between flows only across zones in strongly coupled zones. This results in a total of $$\binom{Z}{2} \cdot \binom{2N/Z}{4} \cdot 3,$$

which translates to $$O\left(\frac{N^4}{Z^2}\right)$$

measurements, where Z is the number of zones in the network and nodes are assumed to be equally split across the zones (e.g., $$\frac{N}{Z}$$

per zone).

In accordance with the present principles, the reduction in the amount of measurements determined is a direct result of restricting pairs of node measurements for every node to only randomly selected pairs of nodes in strongly coupled zones, e.g., flow pairs, whose end points are such that they traverse more than two zones, are not measured. Even for the pairs of zones considered, not all flow pairs (involving both local and cross flows) in the two zones are measured. For example, only a fraction x of the net flow pairs $$\binom{2N/Z}{4} \cdot 3$$

in two zones are picked randomly and measured/determined, which is then used to classify the flow interaction models in block 421, described below. For example, the appropriate construction of zones allows the fraction x of the net flow pairs to be as low as, e.g., 10%, while still yielding good prediction accuracy.

In block 420, the method 400 proceeds to contention inferencing 420 to determine which pairs of flows may be activated concurrently in strongly coupled zones to provide spatial reuse capability. In an embodiment, block 420 may include one or more of blocks 421 or 422, described in further detail below. In one embodiment, a plurality of pairs of flows can be concurrently operated if the aggregate throughput between the randomly selected pairs of flows exceeds the average throughput of the pairs of nodes acting in isolation, as illustrated in block 421. In a further embodiment, flows in loosely coupled zones may be activated simultaneously/concurrently to increase network capacity (e.g., through spatial reuse), since the flows do not influence one another in loosely coupled zones.

For example, the training measurements in block 410 may be used in conjunction with a set of machine learning classifiers in block 420 to determine which pairs of flows in strongly coupled zones can be activated simultaneously without negatively impacting the zones in a significant manner. In an embodiment, the classifiers may be chosen so as to capture the unique features of the PLC network framework (e.g., small training set, bursty noise due to switching on/off of devices, etc.). Accordingly, an appropriate set of machine learning classifiers may be employed to accurately classify flow pairs into those that yield a higher aggregate throughput during concurrent operation (e.g., flow pairs that are reuse-friendly) and those that do not.

In block 421, a set of features that capture interactions between the transceiver pairs of the flows may be identified, and a combination of multiple classifiers (e.g., a combination of a set of classification models) may be employed to use the set of features as input and determine if the flow pairs are amenable to concurrent activation. Whether or not two transceiver pairs can simultaneously communicate depends on the interactions between them (e.g., carrier sensing, interference, noise etc. affect these interactions). In an embodiment, all possible interactions between the transceiver pairs (e.g., every pair from the four nodes) are considered as the basis feature set. In an embodiment, the basis feature set may be reduced so as to make the process faster and more accurate. This reduction is based on data mining techniques (e.g., dimensionality reduction).

In a further embodiment, the classification algorithm in block 421 uses the reduced set of feature values and maps them onto two clusters (e.g., one for concurrent, one for isolated). Different classifiers use different methodologies to construct the a priori clusters. Although the PLC environment is relatively stable, there could be noise in the training set due to appliances and devices that are plugged on/off. Accordingly, in one embodiment it is preferable that the classifier is noise resistant.

In an embodiment, determining a plurality of pairs of flows that can be concurrently operated based on whether the aggregate throughput exceeds the average throughput in block 421 includes employing a combination of multiple classifiers. For example, at least three classifiers may be combined to achieve very high accuracy. A running example employing at least three classifiers will be described in further detail below with reference to FIG. 6.

After determining a plurality of pairs of flows (e.g., flow pairs) that may be activated concurrently, the method proceeds to block 422. In block 422, a resulting throughput of all of the pairs of flows that can be concurrently operated (e.g., flow pairs that are reuse-friendly) is estimated and/or predicted. For example, the total potential throughput (e.g., the resulting throughput) for a given pair of flows that are activated concurrently, along with the individual contribution of the flows in the pair, is estimated and later used in block 430 for scheduling. In an embodiment, a prediction model may be employed to determine the gains possible in throughput if multiple flow pairs are activated simultaneously across strongly coupled zones. Advantageously, the present principles determine which flow pairs interact with each other and in what ways, such as if the flows can be simultaneously activated and, if so, what gains in throughput are viable.

In one embodiment, the prediction model may include a boosting tree (BT) as a regression approach for prediction. BT is an ensemble method that fits complex non-linear variables (e.g., features) to predict outcomes. In addition to being fast, BT is resistant to missing data (e.g., low amount of training data) and eliminates outliers due to noise. In addition, BT may achieve high prediction accuracy by adaptively combining multiple binary trees. Accordingly, the prediction model in block 422 provides the resulting throughput.

In block 430, a schedule for flows may be determined, including flows acting in isolation and pairs of flows that may be operated concurrently. In an embodiment, block 430 may include block 431. In block 431, a schedule for scheduling flows and/or pairs of flows for spatial reuse capability is optimized based on the resulting throughput. For example, the measurements determined in the training block 410 and the estimations in the contention inferencing block 420 are used to schedule the flows towards maximizing a network wide utility. Advantageously, the present principles provide a function that achieves the maximum throughput while simultaneously providing proportional fairness between flows (across epochs) and prioritizing latency-sensitive flows as needed. In one embodiment, the scheduling problem above is Non-deterministic Polynomial-time hard (NP-hard) since it maps onto a maximum weighted independent set (MWIS) problem. Therefore, the present principles provide a scheduling approach that performs quite well as compared to the optimum in small scale settings.

In an embodiment, an efficient scheduling algorithm may determine a set of flows that may operate concurrently at the granularity of time epochs (order of 100 ms). In a further embodiment, all possible schedules may be generated and an optimum schedule may be selected, with the optimum scheduling yielding the highest utility. Accordingly, an appropriate set of flows to operate concurrently may be selected and/or scheduled so as to not degrade their individual throughputs appreciably.

In one embodiment, a scheduling problem, which may be cast as a utility maximization problem, may be represented by:

$$\text{Maximize} \sum_{\mathscr{F}} U(\bar{\tau}_f) \quad (1)$$

where $\bar{\tau}_f$ represents the average throughput received by flow f in epoch $T_c$, $\mathscr{F}$ represents the set of flows in the system, and $U(\ )$ is the utility function. Note that the choice of the utility function determines the fairness policy in the system. In one embodiment, a proportional fairness ($U(\bar{\tau}_f) = \beta_f \log(\bar{\tau}_f)$) that is popular in both the wired and wireless networks owing to its ability to strike a balance between throughput and fairness, is selected. $\beta_f$ is the priority weight for the flow (e.g., latency-sensitive flows could have higher priority). Specifically, the scheduling problem takes into account flow diversity and allocates resources to provide (long-term, $T_c$) average throughputs ($\bar{\tau}_f$) that are proportional to the flows' priority and transmission rate. Solving the above problem ensures that the aggregate throughput of the flows is maximized in a proportionally fair manner over time scales of $T_c$.

In another embodiment, optimizing a schedule for the pairs of flows that can be concurrently operated may be conducted at every epoch ($T_e$). For example, a fine time scale may be used to determine updated flow measurements in the PLC network and incrementally update the zone construction, as illustrated in block 440, which will be described in further detail below. Because news nodes may join the PLC network and current nodes present in the PLC network may leave, incremental updates to the individual flow measurements and/or zone construction may affect the scheduling in block 430.

Accordingly, in one embodiment, achieving an optimized schedule using Equation 1 is equivalent to solving the following per-epoch ($T_e$) scheduling problem, namely by maximizing the aggregate marginal utility in every epoch, e.g., Maximize $\Sigma_{f \in \mathcal{F}} \Delta U(\bar{\tau}_f)$. $\Delta U_f$ denotes the marginal utility received by flow f in the epoch and is given by $$\frac{dU_f}{dT_e} = \frac{dU_f}{d\bar{\tau}_f} \cdot \frac{d\bar{\tau}_f}{dT_e} = \frac{\beta_f \tau_f}{\bar{\tau}_f}$$

for proportional fairness, where $\tau_f$ is the predicted throughput (transmission rate) for flow f in the current epoch, and $\bar{\tau}_f$ is the long term average throughput received by the flow f (e.g., tracks fairness over $T_c$). At the end of every epoch t, the average throughput received by a flow f is may be updated as follows:

$$\bar{\tau}_f(t) \leftarrow \left(1 - \frac{1}{T_e}\right)\bar{\tau}_f(t-1) + \left(\frac{1}{T_e}\right)\tau_f(t), \quad (2)$$

$$\tau_f(t) = 0,$$

if not scheduled

Advantageously, updating the average throughput through an exponentially weighted moving average allows for fast adaptation to network dynamics. By tracking the throughput allocations received by through the long term average throughput $\bar{\tau}_f$, optimizing a schedule may include applying a weight to the flow, such as $$\frac{1}{\bar{\tau}_f},$$

in the next epoch to track fairness at time scales of $T_c$, in accordance with one embodiment. The per-epoch scheduling problem may be represented as follows:

$$\text{Maximize}_S \sum_{f \in S} \frac{\beta_f \tau_{f,S}}{\bar{\tau}_f} \quad (3)$$

where $\beta_f$ and $\bar{\tau}_f$ serve as constant weights for the flow in the current epoch. Hence, the optimization is with respect to the flows chosen for schedule (S) in the current epoch, wherein the throughput of a flow chosen for schedule depends on its interactions with other flows in the set S that will be scheduled concurrently. Thus, flow(s) that should be scheduled concurrently at the application layer to maximize Equation 3 may be determined.

In an embodiment, based on the determined measurements, flows and/or flow pairs may be selected as long as they do not impact each other (e.g., disjoint). Accordingly, optimizing a schedule may be captured through a maximum weight independent set (MWIS) problem as follows. Each of the individual flows (f) and each of the reuse-friendly flow pairs (f, f') may be represented as a separate vertex on a graph G, with a weight ($w_i$) of the vertex (i) being a weighted throughput yielded by the flow $$\left(w_i = \frac{\beta_f \tau_f}{\bar{\tau}_f}\right)$$

or flow pair $$\left(w_i = \frac{\beta_f \tau_{f,ff'}}{\bar{\tau}_f} + \frac{\beta_{f'} \tau_{f,ff'}}{\bar{\tau}_{f'}}\right)$$

accordingly. Any two vertices whose mutual flows are not disjoint have an edge between them in the graph. In an embodiment, if two vertices represent a flow pair each, then each of the flows in one pair must be disjoint with respect to each of the flows in the other pair to avoid an edge in the graph. In an embodiment, a subset of flows and flow pairs that are disjoint such that the aggregate weighted throughput of the subset is maximum may be determined. Accordingly, an independent set of vertices (e.g., disjoint flows/flow-pairs) on graph G with maximum weight is determined to yield the optimum solution to the scheduling problem.

Because finding even a maximum independent set (e.g., without weights or equivalently unit weights) on general graphs is NP-hard, an algorithm for the maximum independent set (MIS) problem may be employed in accordance with one embodiment, where at each iteration the vertex with the smallest degree is chosen and added to the independent set and its edges and neighboring vertices are removed. Accordingly, the algorithm may be adapted to select the vertex (i*) that yields the smallest loss in each iteration, namely:

$$i^* = \underset{i}{\arg\min} \, \gamma_i, \quad (4)$$

where $$\gamma_i = \sum_{j \in N(i)} w_j - w_i$$

where $w_i$ represents the weight of a flow or flow pair, i represents the vertex under consideration, while j represents a neighboring nodes/vertices of i, $w_j$ represents the weight of a designated node, j, and $\gamma_i$ is the loss in weight when vertex I is included in the schedule.

Note that, when a vertex (e.g., a flow or flow pair) is selected, its neighbors may be eliminated from the schedule and hence their weight contribution. Thus, at each iteration, the algorithm strives to select the vertex that not only contributes maximum weight by its addition to the schedule, but also minimum loss due to removal of its neighbors. Accordingly, a set of flows and flow pairs that are mutually disjoint are determined and may be scheduled concurrently in the current epoch to maximize the aggregate weighted throughput during the optimizing block. In an embodiment, at the end of the epoch, the average throughputs ($\bar{\tau}_f$) of all the flows may be updated based on Equation 2, which in turn affects theirs corresponding weights $$\frac{\beta_f}{\bar{\tau}_f}$$

and hence controls the relative flow priorities (e.g., track fairness) for scheduling in the next epoch.

In block 440, average throughputs may be updated at every epoch $T_e$ and used to update the training in block 410, contention inferencing in block 420, and flow scheduling in block 430. In an embodiment, a fine time scale may be used to incrementally update the zone construction in block 412. Fine time scale updates are invoked, for example, if a new node joins the network, a node leaves the network, or throughputs on certain flows between each pair of nodes significantly changes. For example, a fine time scale may incrementally update constructed zones at every epoch ($T_e$) based on user (node) arrivals/departures, significant changes in flow throughput in prior epochs, etc. The addition or removal of new users and/or electrical appliances or changes in the flow throughput on the PLC network impact the construction of zones. Such changes and/or impact may be collected by the central controller for every epoch ($T_e$).

For example, when a new node is connected to the PLC network (e.g., a user plugs in a device into the network), throughput measurements from the new node to each neighboring node may be determined. Accordingly, a new node may be included in a zone if all nodes in the particular zone have h links to the new node. If a node leaves the PLC network, it is simply excluded from all the zones. If the PLC channel dynamics change the throughputs of certain flows significantly, the nodes associated with those flows are first removed from their existing zones and zones are reassigned by considering them as new nodes. In one embodiment, the process is executed sequentially by considering one node at a time.

In an embodiment, the method 400 described in FIG. 4 may be implemented at, for example, a central coordinator, whose responsibility is assumed by one of the nodes in the PLC network. In a further embodiment, the method 400 may be implemented at the application layer on commercial off-the-shelf PLC adaptors of two different vendors. For example, one node may serve as the coordinator to collect measurements, generate the models and determine the schedule. Flows may be scheduled by the central coordinator in epochs, and fairness between flows is accounted for across epochs. Conveying information, such as the schedule and/or measurements between the adaptors, may be accomplished over the PLC channel itself, however one can also envision to carry this information out-of-band (e.g., using WiFi).

Advantageously, the present principles leverage the quasi-stationary nature of the PLC network to learn and predict the impact on throughput resulting from the mutual interactions between flows. Using this knowledge, an efficient scheduling algorithm to intelligently and efficiently coordinate transmissions of the multiple flows at the application layer may be applied in a standards-agnostic manner. Accordingly, the present principles scale PLC's throughput performance in multi-flow environments, while accounting for fairness between flows.

Figure 5:
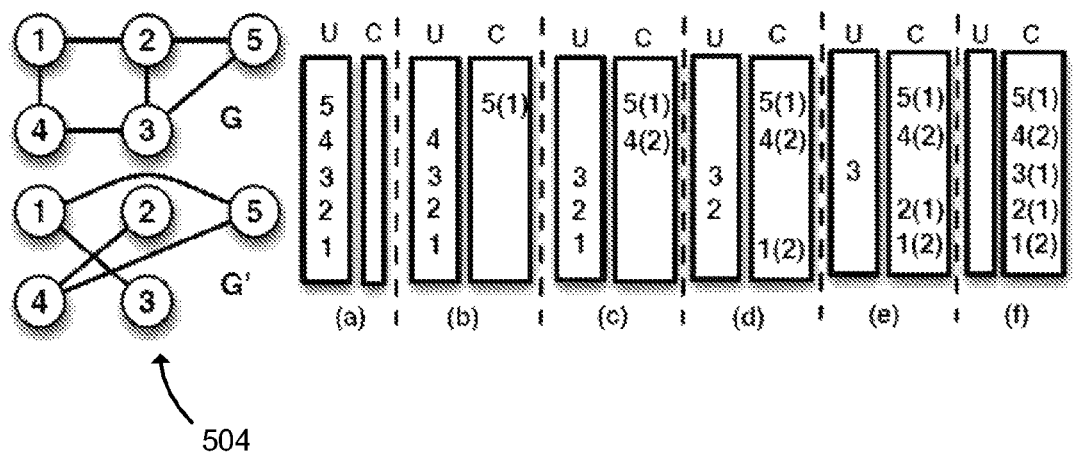
FIG. 5 is a schematic of an exemplary embodiment in accordance with the present principles.

Now referring to FIG. 5, with continued reference to FIGS. 1 and 4, a running example 500 of the execution of Method 1 is illustratively depicted. In an embodiment, the example 500 may be performed on the PLC network 100 of FIG. 1. It should be understood that nodes 504 in FIG. 5 correspond to nodes 104 of FIG. 1. For example, the node designated as node 2 is the same as node 2 in FIG. 5. In FIG. 5, U represents uncolored vertices, C represents colored vertices, and (a)-(f) each represent a step in the execution of Method 1. For example, step (a) indicates the initial step where all nodes (1-5) have not been assigned colors. In contrast, step (f) indicates the final step where all nodes (1-5) have been assigned colors. For example, in step (f), nodes 2, 3 and 5 are all assigned the same color, as indicated in the parentheticals (e.g., 5(1), 3(1), and 2(1)). In the example, nodes 1 and 4 are assigned the same color in contrast to nodes 2, 3 and 5.

In one embodiment, the average flow throughputs between each pair of nodes 504 (e.g., nodes that are able to communicate) is determined and/or measured, as illustrated in block 412 of FIG. 4. According to one embodiment, a graph G=(V,N) may be constructed such that all the nodes 504 form the vertex set V and an edge exists between two nodes if the flow between them yields a first throughput ($\geq \alpha$). Based on the zone definitions, a clique (e.g., a complete sub-graph) in the graph corresponds to a zone. According to the present principles, the minimum set of zones is selected, such as the minimum set of cliques, that will include all the nodes (e.g., all the vertices in the graph).

In one embodiment, the chromatic number of a graph is equal to the minimum number of co-cliques (e.g., cliques in the complement graph) to cover the vertices of the graph. This conclusion may be referred to as Lemma 1. The chromatic number refers to the minimum number of colors to color a graph. Using Lemma 1, the complement of graph G, namely G', may be constructed. Subsequently, the vertices of sub-graph G' are colored. In an embodiment, vertices (e.g., the nodes) belonging to the same color in sub-graph G' form a single zone (e.g., clique) in the original graph G. Thus, the number of zones in G will be similar to the number of colors to color sub-graph G'. In one embodiment, an algorithm for coloring, such as a Welsh-Powell algorithm, may be used to color the zones, where at each iteration, the algorithm selects a vertex (e.g., among uncolored vertices) with the highest degree and assigns it the smallest color (e.g., number) that is not used by any of its neighbors. This algorithm is known to use at most $\max_i \min\{\delta_i+1,i\}$ colors, where $\delta_i$ is the degree of node i in the graph (e.g., nodes are ordered based on their degree). Thus, the algorithm uses at most $\Delta+1$ colors ($\Delta$ being the maximum degree in sub-graph G') and hence constructs at most $\Delta+1$ zones.

Figure 6:
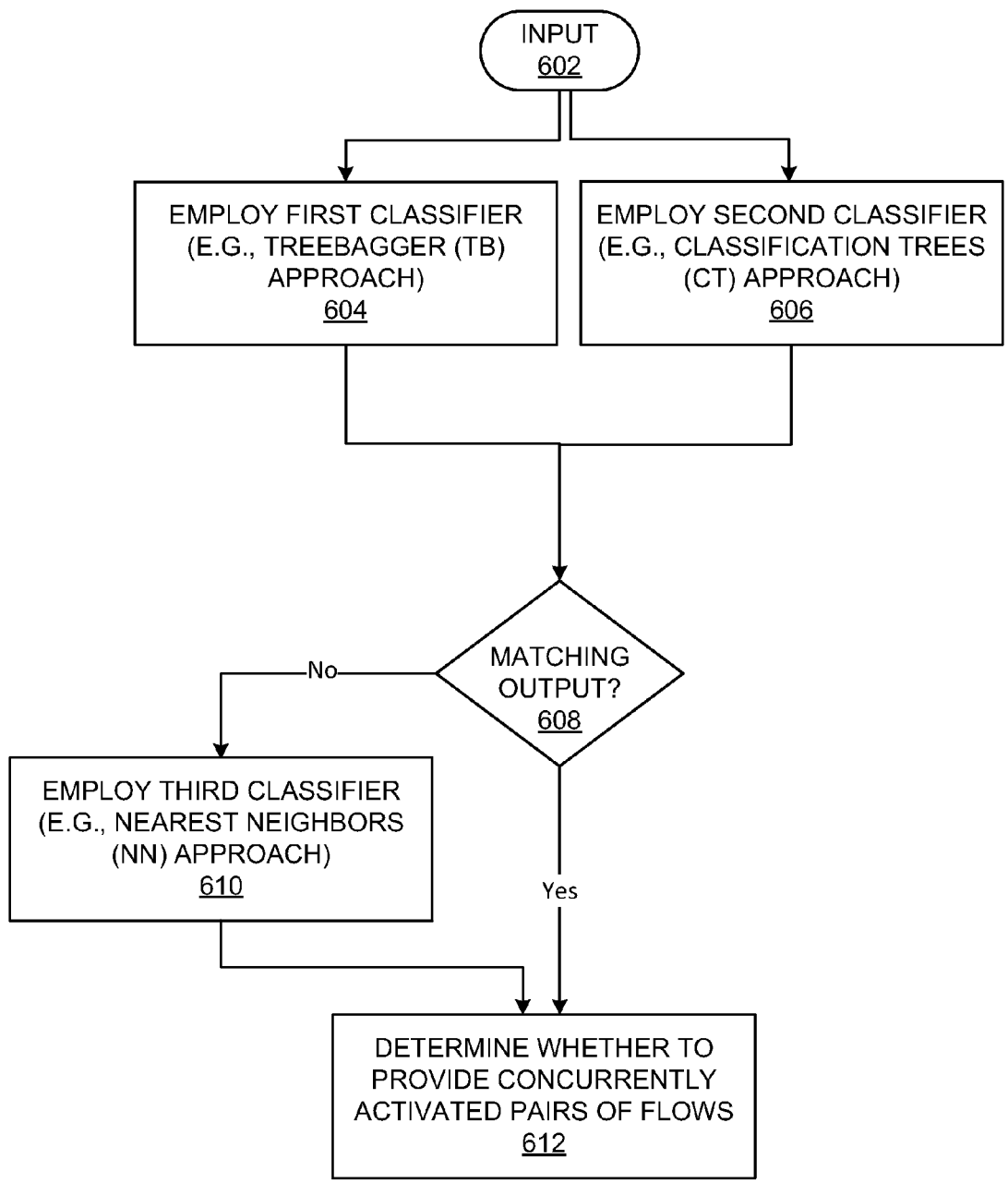
FIG. 6 is a schematic of an exemplary embodiment in accordance with the present principles.

Now referring to FIG. 6, with continued reference to FIG. 4, a running example 600 of the execution of block 421 of FIG. 4 is shown by using the set of features as input in block 602 and applying a TreeBagger (TB) approach in block 604 and a Classification trees (CT) approach in block 606. The outputs of block 604 and block 606 are compared to determine if the outputs are equal in block 608. If the outputs in block 604 and block 606 differ (e.g., one classifier suggests concurrent operations while the other classifier contradicts concurrent operations), a third classifier may be employed in block 610. For example, in FIG. 6, the third classifier is a nearest neighbor classifier (NN), which may be employed to resolve the conflict between the two previous classifiers such that a decision is made whether or not to provide concurrently activated pairs of flows.

The combination of multiple classifiers may include, for example, at least one of a TreeBagger (TB) approach, a Naive Based Classifier (NV) approach, a Nearest Neighbors (NN) approach, a Support Vector Machines (SV) approach, and a Classification trees (CT) approach. Generally, each classifier taken alone may have reduced accuracy due to inherent problems in the classifier. For example, SV suffers from a problem of calibrating class membership probabilities of samples. Hence, choosing the right parameter for the kernel to be customized to all topologies becomes intractable in SV, thereby resulting in false positives and negatives in certain cases. In NV, for example, the posterior probability estimate is affected if there is only a small occurrence of a certain class; for example, all nodes belonging to different zones or the same zone. In such a case, the generated model will be erroneous.

Advantageously, the present principles employs a combination of multiple classifiers in block 221 to enable a higher average accuracy (e.g., 90% accuracy) than any of the individual classifiers. In the example 600 depicted in FIG. 6, CT does not employ a large training set but is sensitive to noise. While the PLC network typically exhibits low noise most of the time, plugging in devices causes noise which may cause CT to underperform. Thus, while CT is generally usable most of the time independently, it needs to be supplemented to deal with the noisy cases. TB uses innovative ordering to reduce impact of noise. However, the ordering in TB inherently introduces a sampling bias, meaning that some clusters may have a better chance of being picked. To reduce bias, a larger training set may be necessary. Thus, while TB eliminates the issue with CT, it brings up a new problem. Thus, in an embodiment, a combination of TB and CT may be employed and, if their output yields the same output decision, the output results are fairly accurate. However, if they output contradicting decisions, a third classifier may be employed for the purposes of resolution. In the example shown in FIG. 6, NN offers lower accuracy than TB and CT with small amounts of training data, but is not sensitive to noise and does not introduce sampling biases. Accordingly, NN offers high accuracy with low complexity.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information", and has the title "VoltNet: Effective Power Line Networking in Multi-flow Environments". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer implemented method for managing a power line communication network in a multi-flow environment, comprising:
   determining an average throughput between each pair of nodes acting in isolation within the power line communication network;
   defining logical zones by grouping each pair of nodes if the average throughput between the pair of nodes exceeds a first threshold, wherein the logical zones include a plurality of strongly coupled zones;
   determining an aggregate throughput for a pair of flows between randomly selected pairs of nodes acting concurrently between the plurality of strongly coupled zones;
   determining a plurality of pair of flows that can be concurrently operated when the aggregate throughput exceeds the average throughput;
   estimating a resulting throughput of the plurality of pair of flows that can be concurrently operated; and
   optimizing a schedule for the plurality of pair of flows in the power line communication network based on the resulting throughput.

2. The method of claim 1, wherein the aggregate throughput includes a throughput between a first pair of nodes in a first strongly coupled zone and a second pair of nodes in a second strongly coupled zone.

3. The method of claim 1, wherein determining whether the aggregate throughput for the pair of flows exceeds the average throughput includes using a combination of multiple classifiers.

4. The method of claim 3, wherein the multiple classifiers includes at least one of classification trees, a tree bagger, and a nearest neighbor classifier.

5. The method of claim 1, wherein the estimating the resulting throughput includes using a boosting trees regression approach.

6. The method of claim 1, further comprising updating the average throughput when a new node joins or an existing node leaves the power line communication network.

7. The method of claim 1, wherein the at least two strongly coupled zones includes a first node in a first zone and a second node in a second zone having an average flow throughput that exceeds a second threshold, the first and second zones being strongly coupled zones.

8. A system for managing a power line communication network in a multi-flow environment, comprising:
   a measurement device to determine an average throughput between each pair of nodes acting in isolation within the power line communication network;
   a zone constructor to define logical zones by grouping each pair of nodes if the average throughput between the pairs of nodes exceeds a first threshold, wherein the logical zones include a plurality of strongly coupled zones;
   a pair selector, coupled to a bus, to determine an aggregate throughput for a pair of flows between randomly selected pairs of nodes acting concurrently between the plurality of strongly coupled zones;
   a classifier to determine a plurality of pairs of flows that can be concurrently operated when the aggregate throughput exceeds the average throughput;
   a throughput predictor to estimate a resulting throughput of the plurality of pair of flows than can be concurrently operated; and
   a scheduler, coupled to the bus, to optimize a schedule for the plurality of pair of flows in the power line communication network based on the resulting throughput.

9. The system of claim 8, wherein the aggregate throughput includes a throughput between a first pair of nodes in a first strongly coupled zone and a second pair of nodes in a second strongly coupled zone.

10. The system of claim 8, wherein the classifier determines whether the aggregate throughput for the pair of flows exceeds the average throughput using a combination of multiple classifiers.

11. The system of claim 10, wherein the multiple classifiers includes at least one of classification trees, a tree bagger, and a nearest neighbor classifier.

12. The system of claim 8, wherein the throughput predictor estimates the resulting throughput using a boosting trees regression approach.

13. The system of claim 8, further comprising an updater to update the average throughput when a new node joins or an existing node leaves the power line communication network.

14. The system of claim 8, wherein the at least two strongly coupled zones includes a first node in a first zone and a second node in a second zone having an average flow throughput that exceeds a second threshold, the first and second zones being strongly coupled zones.

* * * * *